United States Patent
Schmollgruber et al.

(10) Patent No.: US 12,505,678 B2
(45) Date of Patent: Dec. 23, 2025

(54) TWO-DIMENSIONAL SEMANTIC FILTERING FOR STEREO IMAGES IN HIGH NOISE ENVIRONMENTS

(71) Applicant: Stereolabs SAS, Montrouge (FR)

(72) Inventors: Cecile Schmollgruber, Boulogne (FR); Edwin Azzam, Antony (FR); Olivier Braun, Vanves (FR); Pierre Yver, Saint Georges de Reintembault (FR)

(73) Assignee: Stereolabs SAS, Montrouge (FR)

( * ) Notice: Subject to any disclaimer, the term of this patent is extended or adjusted under 35 U.S.C. 154(b) by 0 days.

(21) Appl. No.: 19/200,612

(22) Filed: May 6, 2025

(65) Prior Publication Data

US 2025/0363808 A1    Nov. 27, 2025

Related U.S. Application Data

(60) Provisional application No. 63/651,924, filed on May 24, 2024.

(51) Int. Cl.
  *G06V 20/58*    (2022.01)
  *G06V 10/30*    (2022.01)
  (Continued)

(52) U.S. Cl.
  CPC .............. *G06V 20/58* (2022.01); *G06V 10/30* (2022.01); *G06V 10/765* (2022.01);
  (Continued)

(58) Field of Classification Search
  CPC ........ G06V 20/58; G06V 20/70; G06V 10/30; G06V 10/765; G06V 10/809; G06V 10/82; G06V 2201/07
  See application file for complete search history.

(56) References Cited

U.S. PATENT DOCUMENTS

2010/0013615 A1    1/2010  Hebert et al.
2021/0350150 A1*  11/2021  An ...................... G06V 30/1902
(Continued)

FOREIGN PATENT DOCUMENTS

JP        5160370 B2    3/2013

OTHER PUBLICATIONS

Ruetz et al, Forest Traversability Mapping (FTM): Traversability estimation using 3D voxel-based Normal Distributed Transform to enable forest navigation, 2022, IEEE/RSJ International Conference on Intelligent Robots and Systems, pp. 1-9. (Year: 2022).*

(Continued)

*Primary Examiner* — Kathleen M Broughton
(74) *Attorney, Agent, or Firm* — Daylight Law, P.C.

(57) ABSTRACT

Systems and methods related to soft obstacle detection are disclosed herein. The systems may include a stereo camera with two image sensors. An image from each of the two images sensors may be used to produce a geometric traversability map, which may be a depth map or a height map. An image from one of the image sensors may be used to produce a semantic traversability map based on semantically classifying portions of the image. The geometric traversability map and the semantic traversability map, each with element confidence scores, may be fused to create a fused traversability map. Specific elements of the images may be absent from the fused traversability map based on the characteristics of those elements. The fused traversability map may be a filtered 3D representation of the environment and may reduce false positives and false negatives in obstacle detection.

21 Claims, 10 Drawing Sheets

(51) Int. Cl.
*G06V 10/764* (2022.01)
*G06V 10/80* (2022.01)
*G06V 10/82* (2022.01)
*G06V 20/70* (2022.01)

(52) U.S. Cl.
CPC ............ *G06V 10/809* (2022.01); *G06V 10/82* (2022.01); *G06V 20/70* (2022.01); *G06V 2201/07* (2022.01)

(56) References Cited

U.S. PATENT DOCUMENTS

| | | | | |
|---|---|---|---|---|
| 2021/0405638 | A1* | 12/2021 | Boyraz | G06V 20/64 |
| 2023/0206647 | A1 | 6/2023 | Huang | |
| 2023/0351769 | A1* | 11/2023 | Wu | G06V 10/762 |
| 2024/0125899 | A1* | 4/2024 | Khadem | G06V 10/82 |
| 2024/0273919 | A1* | 8/2024 | Smolyanskiy | G06T 19/006 |

OTHER PUBLICATIONS

Sock et al, Probabilistic traversability map generation using 3D-LiDAR and camera, 2016, IEEE International Conference on Robotics and Automation, pp. 1-8. (Year: 2016).*

D. Maturana et al. (2017). Real-Time Semantic Mapping for Autonomous Off-Road Navigation. International Symposium on Field and Service Robotics.

A. Pon (2020). Object-centric stereo matching for 3d object detection. In 2020 IEEE International Conference on Robotics and Automation (ICRA) (pp. 8383-8389). IEEE.

B. Arain (2019). Improving Underwater Obstacle Detection using Semantic Image Segmentation. 2019 International Conference on Robotics and Automation (ICRA), 9271-9277.

International Search Report and Written Opinion dated Jul. 14, 2025 from International Application No. PCT/IB2025/055003, 13 pages.

V. Miclea (2020). Real-Time Semantic Segmentation-Based Stereo Reconstruction. IEEE Transactions on Intelligent Transportation Systems, 21, 1514-1524.

* cited by examiner

| Classification 401 | Probability of Obstacle 402 | Traversability 403 |
|---|---|---|
| Humans | 80-100 | 0-20 |
| Animals | 80-100 | 0-20 |
| Grass | 0 | 100 |
| Trees | 70-80 | 20-30 |
| Plants | 60-80 | 20-40 |
| Pipes (Water. Electricity) | 80-90 | 0-10 |

TWO-DIMENSIONAL SEMANTIC FILTERING FOR STEREO IMAGES IN HIGH NOISE ENVIRONMENTS

CROSS REFERENCE TO RELATED APPLICATIONS

This application claims the benefit of U.S. Provisional Patent No. 63/651,924, filed on May 24, 2024, which is incorporated by reference herein in its entirety for all purposes.

BACKGROUND

Autonomous systems are making significant advancements in obstacle detection and avoidance, a crucial aspect of their ability to interact with their environments. For example, modern self-driving vehicles are equipped with an array of sensors, including lidar, radar, and cameras, that work together to detect and classify obstacles in real-time. Advanced machine learning algorithms process this sensory data to identify fixed obstacles and predict the movement of mobile obstacles, enabling the vehicles to make swift and safe decisions regarding obstacle avoidance. Improvements in software, such as enhanced object recognition and path planning, are further refining their ability to navigate complex environments.

The use of stereo cameras has emerged as a pivotal technology in enhancing autonomous systems. Stereo cameras capture images from slightly different angles, mimicking human binocular vision to create a three-dimensional representation of the environment in which the autonomous system is operating. This three-dimensional representation allows autonomous systems to accurately gauge the distance and size of objects, improving their ability to navigate through or otherwise interact with complex and dynamic environments.

Companies are increasingly integrating stereo vision with other sensors to create a robust, multi-sensory approach to navigation. This fusion of data from stereo cameras with data from other sensors enhances the vehicle's understanding of its surroundings, leading to more reliable obstacle detection and avoidance, ultimately contributing to safer and more efficient autonomous driving experiences. However, alternative sensors such as lidar sensors can be expensive and bulky, such that stereo cameras offer a more cost-effective and compact solution. Accordingly, active area research is directed to approaches that more efficiently and accurately generate three-dimensional representations of an environment in which a system is operating using only data from a stereo camera. These approaches provide benefits both in systems in which stereo cameras alone generate the representation, and those in which the stereo cameras contribute to the generation of the representation, because the resulting contribution of the stereo cameras is more accurate.

SUMMARY

This disclosure relates to the field of autonomous systems and obstacle detection. For example, this disclosure relates to autonomous navigation and obstacle avoidance. In an unconstrained environment, obstacles depend on many parameters. Simply detecting that an object is nearby is not sufficient, as something in front of you may not necessarily be an obstacle (for example, high grass in a field). Naive interpretations of 3D data (from any kind of sensor, lidar, stereo camera, or ultrasonic sensor) will lead to trigger alerts as soon as something is close, even if that something is harmless. This is known as a false positive—the detection system triggers an alert for an obstacle that isn't present or dangerous. False positives can lead to a request for unneeded interventions which can waste the time of operators. Additionally, false positives can lead to the costly stoppage of heavy machines and a reduction in the efficiency of a given navigation mission.

Another important aspect of navigation technology that relates to this disclosure is safety through redundancy. Some sensors or obstacle detection methods may be less sensitive or even blind to certain types of obstacles, for instance, elements that are not geometrically prominent or slightly hidden but shouldn't be missed. This is a false negative—where the system should have detected the obstacle but didn't. This type of error can cause material damage or catastrophic consequences for the navigation mission. Fusing multiple detection systems provides complementary information and can eliminate blind spots and false negatives.

The challenge is to have high-level data about the environment. High-level data may reduce false positives and false negatives, saving time, energy, and resources in the use of autonomous systems. Fusing multiple detection systems provides complementary information and may identify the traversability of a path while considering soft obstacles, slightly hidden obstacles, and more.

A system with an autonomous machine may include a stereo camera with two (or more) image sensors and gain a full knowledge of the environment. The system may provide redundant information to handle unknown scenes safely. The system may generate a semantic classification using a semantic classifier and one or more images (e.g., a first image from the first sensor, a second image from the second sensor, or both). The system may generate a geometric classification using the one or more images. The system may use information gathered in the images to generate a three-dimensional (3D) representation of the environment of the autonomous machine. For example, the 3D representation may be made using point matching between the first image and the second image. The 3D representation may be a depth map, a 3D point cloud, or another organization of data. The 3D representation may be filtered or unfiltered.

The system may produce a filtered 3D representation of the environment of the machine (e.g., autonomous vehicle) using the semantic classification, the first image, and the second image. In specific embodiments, the 3D representation and the semantic classification may be fused to produce a traversability map. The semantic classifier may identify elements to eliminate to create the filtered 3D representation. The semantic classifier may identify one or more elements that have a high homogeneity at the element level (e.g., elements relating to the sky). The semantic classification may also identify specific classifications to be eliminated (e.g., a group of elements may be classified as the sky, and the sky is tagged as a classification to be eliminated). The system may output a signal based on detecting a potentially dangerous object.

The system may classify objects using a neural network. Potential objects may have a confidence value associated with them that describes how traversable the object may be. If an object is deemed dangerous, the machine may stop and may alert a user. The user may identify whether the object is dangerous or not, or if the object is traversable or not. Input from the user may be used for training the neural network. Thus, the system may continue to learn as it is used.

By eliminating the elements (or points) with high element-level homogeneity or other elements, the filtered 3D representation may have less noise than the (non-filtered, original) 3D representation. Elements may be eliminated prior to matching points from the first image with points from the second image to reduce time spent matching points. The filtered 3D representation may allow identification of potential obstacles in the travel path of the machine and may assist in rerouting the machine.

In specific embodiments of the invention, a method for detecting an obstacle with a stereo camera comprising at least two image sensors is provided. The method comprises: generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image; producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering; and generating an obstacle detection signal using the filtered three-dimensional representation of the environment.

In specific embodiments of the invention, a system for detecting an obstacle is provided. The system comprises: at least two image sensors forming a stereo camera; one or more processors; one or more non-transitory computer-readable media storing instructions, which when executed by the one or more processors cause the one or more processors to conduct a method for detecting the obstacle with the stereo camera. The method comprises: generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image; producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering; and generating an obstacle detection signal using the filtered three-dimensional representation of the environment.

In specific embodiments of the invention, one or more non-transitory computer-readable media storing instructions, which when executed by one or more processors cause the one or more processors to conduct a method for detecting an obstacle with a stereo camera comprising at least two image sensors, are provided. The method comprises: generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image; producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering; and generating an obstacle detection signal using the filtered three-dimensional representation of the environment.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 4 provides an example of a chart that includes a range of probabilities of obstacles and a range of traversabilities for given classifications in accordance with specific embodiments of the inventions disclosed herein.

DETAILED DESCRIPTION

Figure 1:
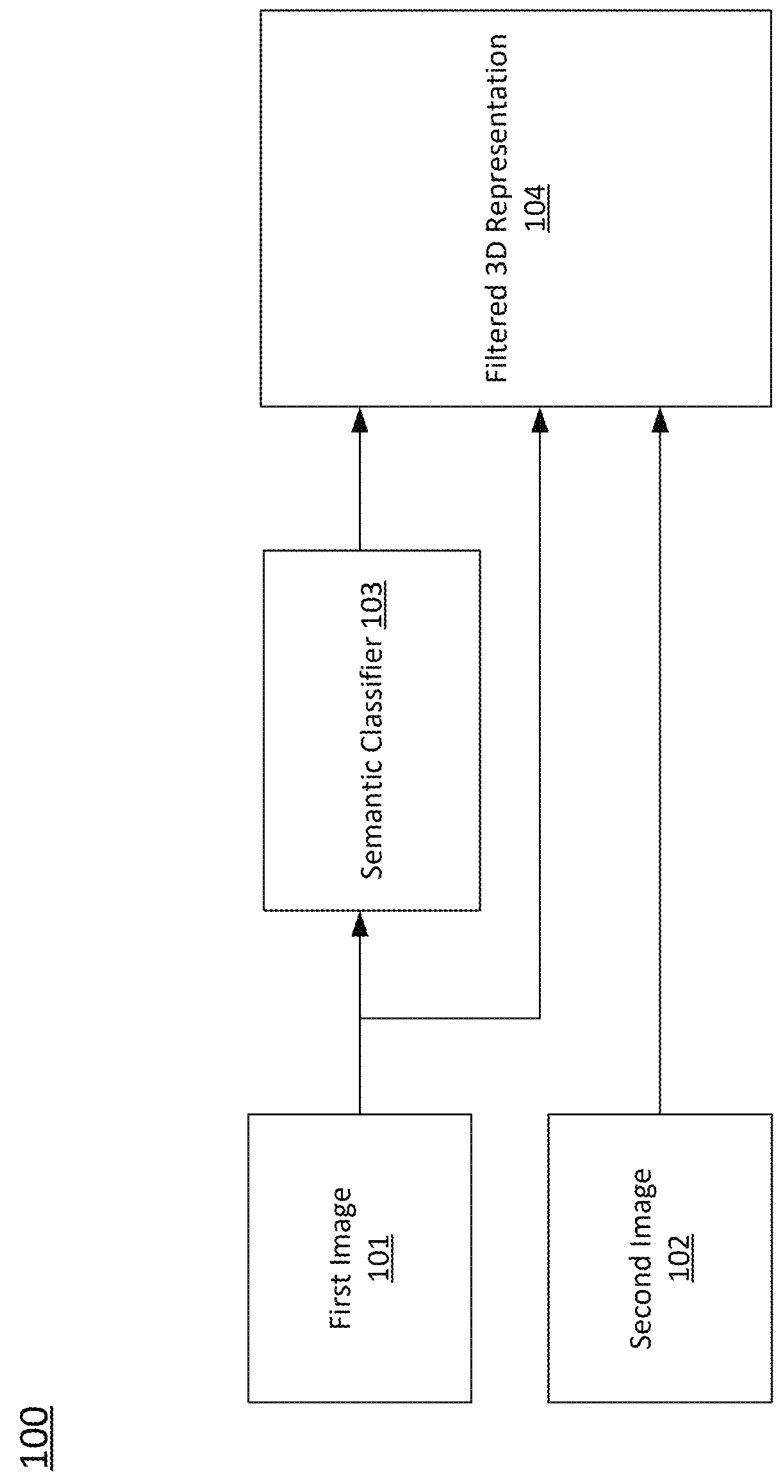
FIG. 1 provides an example of a process for creating a filtered three-dimensional (3D) representation in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for soft obstacle detection in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

A system with an autonomous machine may include a stereo camera with two (or more) image sensors. The calibrated stereo camera may provide depth information and color images. In specific embodiments, the depth information combined with the color images (and, in specific embodiments, external sensors such as inertial measurement units (IMU), global navigation satellite systems (GNSS), wheel odometry etc.), can be used to compute machine position in space over time. The system may use knowledge of the position of the sensor, floor orientation, and position, surrounding semantic information, and application purpose to have a full knowledge of the environment. The system may provide redundant information to handle unknown scenes safely.

The system may generate a semantic classification using a semantic classifier and one or more images (e.g., a first image from the first sensor, a second image from the second sensor, or both). The system may generate a geometric classification using the one or more images. The system may use information gathered in the images to generate a three-dimensional (3D) representation of the environment of the autonomous machine. For example, the 3D representation may be made using point matching between the first image and the second image. The 3D representation may be a depth map, a 3D point cloud, or another organization of data. The 3D representation may be filtered or unfiltered.

The system may produce a filtered 3D representation of the environment of the machine (e.g., autonomous vehicle) using the semantic classification, the first image, and the second image. In specific embodiments, the 3D representation and the semantic classification may be fused to produce a traversability map. The semantic classifier may identify elements to eliminate to create the filtered 3D representation. The semantic classifier may identify one or more elements that have a high homogeneity at the element level (e.g., elements relating to the sky). The semantic classification may also identify specific classifications to be eliminated (e.g., a group of elements may be classified as the sky, and the sky is tagged as a classification to be eliminated). The semantic classifier may classify elements that are difficult to match between the first and second images, may classify elements that are easy to match between the first and second images, or both. The system may classify one or more potential obstacles in the environment as a penetrable object (e.g., traversable) or a non-penetrable object (e.g., non-traversable, dangerous). For example, the system may classify grass, tree trunks, tree branches, construction equipment, vehicles, humans, animals, equipment, structures, and more. The system may output a signal based on detecting a potentially dangerous object.

The system may classify objects using a neural network. Potential objects may have a confidence value associated with them that describes how traversable the object may be. If an object is deemed dangerous, the machine may stop and may alert a user. The user may identify whether the object is dangerous or not, or if the object is traversable or not. Input from the user may be used for training the neural network. Thus, the system may continue to learn as it is used.

By eliminating the elements (or points) with high element-level homogeneity or other elements, the filtered 3D representation may have less noise than the (non-filtered, original) 3D representation. Elements may be eliminated prior to matching points from the first image with points from the second image to reduce time spent matching points. The filtered 3D representation may allow identification of potential obstacles in the travel path of the machine and may assist in rerouting the machine.

FIG. 1 illustrates an example of process 100 of creating filtered 3D representation 104 in accordance with specific embodiments of the inventions disclosed herein. Process 100 may be used to create a traversability map, for example, of an autonomous vehicle, semi-autonomous vehicle, or other machine. Process 100 may allow the identification of obstacles. First image 101 may be from a first image sensor and second image 102 may be from a second image sensor. First image 101 and second image 102 may each be a two-dimensional (2D) representation of the environment in visible light. The first and second image sensors may be part of a stereo camera. The stereo camera may be mounted, for example, towards the front of an autonomous vehicle (such as an autonomous ground vehicle) and may generally point in the direction (e.g., vector) of motion of the vehicle. Although two images associated with two images sensors are shown, in specific embodiments, more than two images may be taken from any number of cameras or image sensors. For example, multiple stereo cameras may be incorporated into process 100.

Portions of first image 101 may be classified into different objects by semantic classifier 103. Semantic classifier 103 may classify grass, tree trunks, tree branches, construction equipment, vehicles, humans, animals, equipment, and structures in first image 101. For example, first image 101 may be segmented into portions with a tree in the left portion of the field of view, a path in the lower-middle of the field of view, sky in the upper-middle field of view, and grass in the right field of view and the far-left field of view, among other objects at various locations.

In specific embodiments, before or while objects in first image 101 are being classified, elements or groups of elements of first image 101 may be eliminated. In specific embodiments, a group of elements with high element-level homogeneity may be removed. For example, a patch of sky in first image 101 may be made up of elements that share a similar color, similar brightness, etc. In this case, neither the sky nor the autonomous vehicle poses a threat to the other, and the autonomous vehicle may ignore the sky. Accordingly, the system may be programmed to remove the elements with high element-level homogeneity. In specific embodiments, the system may eliminate elements that are difficult to match between the stereo camera images. By removing elements of first image 101, relevant portions of first image 101 may be classified faster and the classification of first image 101 may take less memory and power. Additionally, subsequent steps of process 100, such as creating the filtered 3D image may be faster, take less memory, and use less power.

In specific embodiments, after objects in first image 101 are classified, elements or groups of elements of first image 101 may be eliminated. For example, a group of elements classified as the sky may be removed. In this case, neither the sky nor the autonomous vehicle poses a threat to the other, and the system may be programmed to ignore the sky. Accordingly, the elements classified as "sky" may be removed. By removing elements of first image 101, subsequent steps of process 100, such as creating the filtered 3D image may be faster, take less memory, and use less power.

Elements that are eliminated from first image 101 may be replaced by dummy points. For example, in a depth map, the depth information of the eliminated points could be replaced by a known value. This value could be a negative value (which would not occur normally) such as −1,000,000, or the maximum possible depth value (INT_MAX). That way, the system may recognize which elements were removed; and any linear algebra or matrix computation may be performed using the depth maps with this awareness.

Filtered 3D representation 104 may be produced using first image 101, second image 102, and semantic classifier 103. Filtered 3D representation 104 may be a 2.5D height map, a 3D point cloud, a 3D depth map, or another manner of organizing of 3D data. Filtered 3D representation 104 may be a traversability map describing whether or not an autonomous vehicle may move forward, where the vehicle can move, or other features relating to the traversability of the environment. First image 101 and second image 102 may be point matched together to create 3D representation 104. For example, the system may match corresponding elements of first image 101 and second image 102, each with different viewpoints of the environment, to locate objects in 3D space. If some elements of first image 101 were eliminated, then corresponding elements of second image 102 may also be eliminated, resulting in these elements being eliminated in 3D representation 104 as well.

First image 101 and second image 102 (e.g., information from the stereo camera) may be combined to give depth to filtered 3D representation 104. Semantic classification of first image 101 may offer more information about the 3D image than the depth information from combining first image 101 and second image 102. For example, semantic classifier 103 may identify power lines as a non-traversable obstacle in the path of the machine. From a purely geometric viewpoint, the machine may be capable of driving over wires. However, driving over power lines (as semantically identified) may be inadvisable. As another example, semantic classifier 103 may identify tall grass as a traversable obstacle in the path of the machine. From a purely geometric viewpoint, the machine may view tall grass as a solid block of material that blocks the path. However, driving through tall grass (as semantically identified) may be permissible.

Filtered 3D representation 104 may be used to generate warnings, machine commands, or another reaction to the environment. For example, filtered 3D representation 104 may be used to identify an obstacle and generate a stop command, stopping the autonomous vehicle before hitting an obstacle (e.g., a critical obstacle, a hazard). Stopping the autonomous vehicle for a false alarm of an obstacle or a negligible obstacle wastes time, power, money, and productivity. In specific embodiments, the autonomous vehicle may be heavy and extra costly to stop and restart. By using filtered 3D representation 104 to identify obstacles, unnecessary stops due to false alarms may be reduced.

Figure 2:
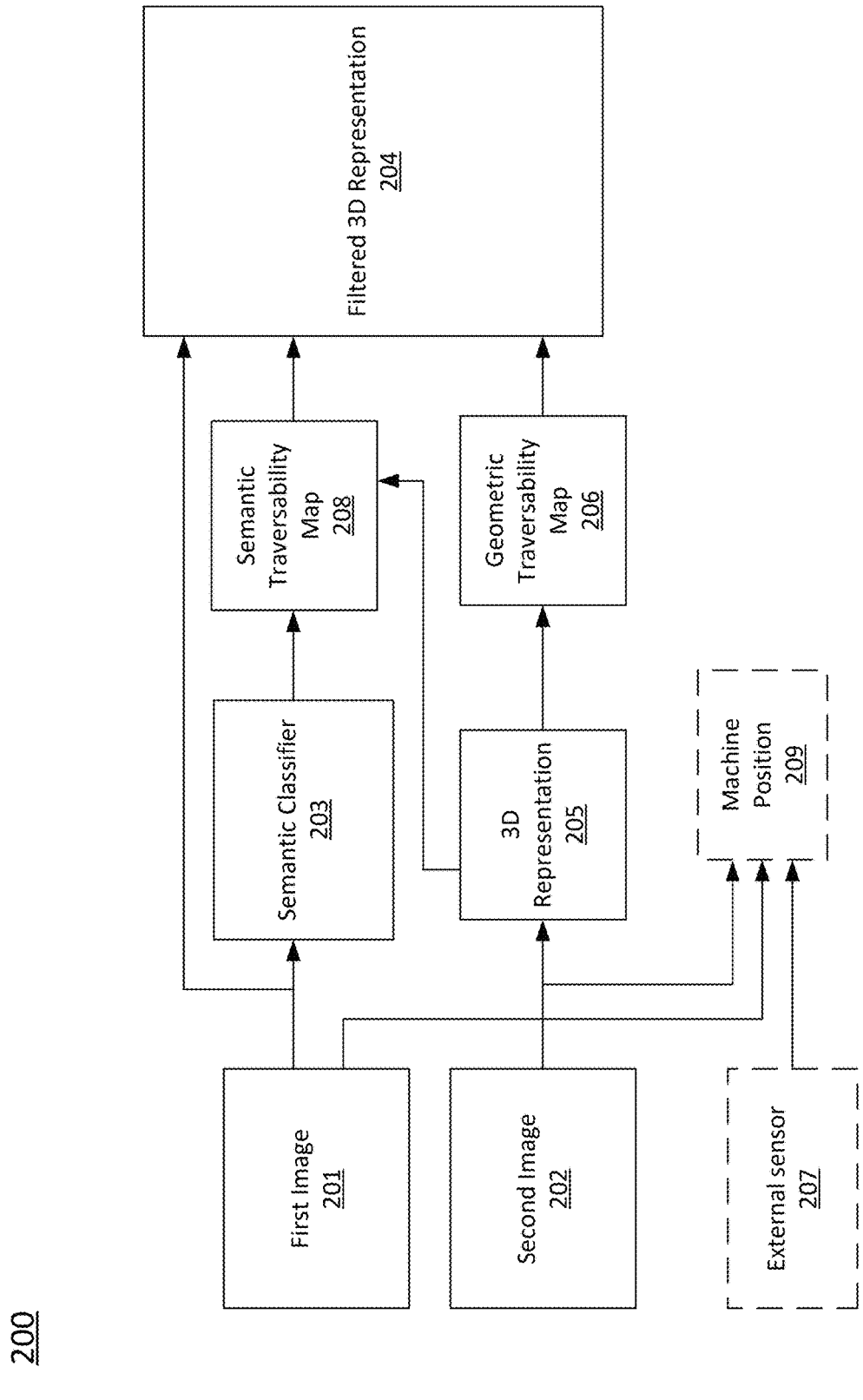
FIG. 2 provides an example of a process for creating a 3D representation and a filtered 3D representation in accordance with specific embodiments of the inventions disclosed herein.

FIG. 2 illustrates an example of process 200 of creating 3D representation 205 and filtered 3D representation 204 in accordance with specific embodiments of the inventions disclosed herein. Process 200 may be used to create a traversability map, for example, of an autonomous vehicle, semi-autonomous vehicle, or other machine. Process 200 may allow the identification of obstacles. First image 201 may be from a first image sensor and second image 202 may be from a second image sensor. The first and second image sensors may be part of a stereo camera, may create colored images, and may correspond to left and right points of view of the travel path of the machine. The stereo camera may be mounted, for example, towards the front of an autonomous vehicle and may generally point in the direction (e.g., vector) of motion of the vehicle. Although two images associated with two images sensors from a single stereo camera are shown, in specific embodiments, multiple stereo cameras may be incorporated into process 200. The stereo camera may be calibrated and may provide depth information. In specific embodiments, the depth information may be combined with first image 201, second image 202, and one or more external sensors 207 (such as IMU, GNSS, wheel odometry etc., or a combination thereof). The combined information may be used to compute the position of the machine in space over time.

First image 201 and second image 202 may act as inputs of the system. In specific embodiments, external sensor 207 may also act as an input of the system. Depth information provided by combining first image 201, second image 202, and external sensor 207 may be used to compute machine position 209 in space over time. External sensor 207 may be a plurality of sensors, such as a combination of IMU, GNSS, wheel odometry, etc. The system may use knowledge of the position of the first image sensor, position of the second image sensor, position of external sensor 207, floor orientation, position of the machine, surrounding semantic information, purpose of the programming, and purpose of the machine to have a full knowledge of the environment.

Portions of first image 201 may be classified into different object categories or traversability categories by semantic classifier 203. Semantic classifier 203 may classify portions of first image 201 in parallel with the generation of 3D representation 205, generation of geometric traversability map 206, or both. To classify portions of first image 201, semantic classifier 203 may use a neural network or a simpler rule based on shape or color, object detection from bounding boxes based on neural networks, etc. Semantic classifier 203 may classify grass, tree trunks, tree branches, construction equipment, vehicles, humans, animals, equipment, and structures in first image 201. Additionally or alternatively, semantic classifier 203 may classify portions of first image 201 as traversable, non-traversable, or unclassified traversability. Semantic classifier 203 may have many different categories, types of categories, or combinations of categories. For example, categories may include traversable objects (e.g., grass), living things (people, animals), etc.

In specific embodiments, elements or groups of elements of first image 201 may be eliminated before, during, or after classifying portions of first image 201. Eliminating portions of first image 201 causes some areas (areas that are known to be unconfident such as the sky, uniform areas, etc.) in semantic traversability map 208 to be omitted or filtered. This filtering limits the number of artifacts that could be considered as obstacles (geometric or semantic obstacles).

In specific embodiments, a group of elements with high element-level homogeneity may be removed (before the elements are classified). In specific embodiments, a group of elements associated with certain classifications (e.g., classified as the sky) may be removed. In specific embodiments, elements that are difficult to match between the first image 201 and second image 202 may be removed. Elements that are eliminated from first image 201 may be replaced by dummy points. An element of first image 201 or of second image 202 may also be referred to as an entry, a pixel, or a point.

Semantic classifier 203 may also classify areas in first image 201 into known objects or areas that are known to be traversable or not. This classification may be provided in the form of a percentage, similar to a probability or confidence.

In specific embodiments, 3D representation 205 (e.g., a previously computed depth map or height map) is used to project the semantically classified first image into 3D space. In other words, the semantic information from the semantically classified first image is added to 3D representation 205 to create semantic traversability map 208 where semantic traversability map 208 is 3D. In specific embodiments, second image 202 may be used to project the semantically classified first image into 3D space. In these embodiments, semantic traversability map 208 is derived from second image 202 rather than 3D representation 205; and depth or height information may be calculated from point matching the semantically classified first image with second image 202.

The 3D image with semantic classification may undergo another semantic analysis or another semantic analysis may be used to project the semantically classified first image onto 3D space to create semantic traversability map 208. For example, 3D representation 205 may be semantically analyzed, or the combined 3D form of the semantically classified first image with second image 202 may be semantically analyzed. In any case, the semantic analysis may be a different semantic analysis than that used by semantic classifier 203 on first image 201, or it may be the same semantic analysis.

A semantic confidence score (e.g., value) may be calculated for each element of semantic classifier 203. The semantic confidence score may estimate the confidence of the identification or detection of the obstacle. The semantic confidence score can be computed based on how confident semantic classifier 203 is that it correctly identified an object from first image 201. The semantic confidence score of an element may indicate a probability (e.g., a semantic probability) of an obstacle. For example, the system may assign a collection of elements a percentage likelihood that the elements correspond to an obstacle. In other words, the semantic confidence score may be an estimate of whether or not a given object is correctly classified at the location in the environment associated with the corresponding element.

The semantic confidence score may also indicate a traversability of an obstacle. The system may store instructions on what to do with different classes (e.g., remove sky from the image or map, assign a traversability score of 95% to grass, assign a traversability score of 1% to a person, etc.). In other words, the semantic confidence score may include information about how certain the system is that an object is in a given location as well as how safe or dangerous traversing that object would be. The measure of safety of traversing an object may be referred to as a traversability score (e.g., grass is 95% traversable, a person is 1% traversable). The inverse of the traversability score is a semantic probability of obstacle. In other words, the traversability score may be 100 minus the probability of the obstacle, and either may be expressed as a percentage (e.g., a person has a traversability score of 1% and a semantic probability of obstacle of 99%). The semantic confidence score (or traversability score) may also take into account the potential risk of incorrectly identifying an object. For example, not identifying a person present in the path may incur greater risk than not identifying a log present in the path.

In specific embodiments, semantic traversability map 208 (generated from a semantically classified 3D representation) may include the semantic confidence scores of each element. In other words, semantic traversability map 208 may be a 3D representation of the environment with a semantic probability of an obstacle for each element. Semantic traversability map 208 may be generated in parallel with, before, or after the generation of 3D representation 205, generation of geometric traversability map 206, or a combination thereof.

In specific embodiments, the semantically classified first image with the semantic confidence scores of each element creates semantic traversability map 208. In other words, assigning semantic confidence scores to elements of first image 201 generates semantic traversability map 208 (without the use of second image 202 or 3D representation 205), which is a 2D representation of the environment with a semantic probability of an obstacle for each element. Semantic traversability map 208 may be generated in parallel with the generation of 3D representation 205, generation of geometric traversability map 206, or both. 3D representation 205 may be created using first image 201 and second image 202. The points of first image 201 and second image 202 may be matched to provide depth information. Over time, using the position of the stereo camera and depth information may allow for 3D reconstruction (e.g., map) of the environment (e.g., surroundings). 3D representation 205 may be a height map (e.g., 2.5D). The 3D reconstruction of the environment from first image 201 and second image 202 may be simplified into a height map by projecting the data into the terrain surface. The height map may be a lighter map representation than the full 3D reconstruction. 3D representation 205 (either as a full 3D reconstruction, as a depth map, or as a height map) may be used to determine geometrical obstacles based on their shapes and their height. An element of 3D representation 205 may be referred to as a cell (e.g., in the context of a height map) or a point (e.g., in the context of a depth map, 3D point cloud, etc.).

If some elements of first image 201 were eliminated (due to properties of the elements such as element-level homogeneity or classification), then corresponding elements of second image 202 may also be eliminated, resulting in these elements being eliminated in 3D representation 205 as well. In specific embodiments, the system may eliminate elements that are difficult to match between the first image 201 and second image 202. In specific embodiments, no elements of first image 201 may be eliminated (e.g., no elements qualify to be eliminated or there are no criteria to eliminate elements), so no elements of second image 202 would be eliminated to point match the two images. In other words, the filtered first image may result in a filtered 3D representation (e.g., a filtered depth map, etc.) that contains a full quantity of elements.

A geometric confidence score (e.g., value) may be calculated for each element of 3D representation 205. The geometric confidence score may estimate the confidence of the detection of the obstacle. The confidence score can be computed based on how well two points from the first image 201 and second image 202 match when generating 3D representation 205. If it is a good match, the confidence is high. If the algorithm is not sure about the match (e.g., an undetermined or bad match), the confidence is low. In specific embodiments, 3D representation 205 is a height map where the height map is generated from the depth map. Each cell of the height map may use the geometric confidence score of the corresponding points in the depth map that were used to produce the height map.

The geometric confidence score of an element may indicate a probability (e.g., a geometric probability) of an obstacle. For example, the system may assign a collection of elements a percentage likelihood that the elements correspond to an obstacle. In other words, the geometric confidence score may be an estimate of whether or not something is actually located at the location in the environment associated with the corresponding element. 3D representation 205, together with the geometric confidence scores of each element may create geometric traversability map 206. In other words, assigning geometric confidence scores (geometric probability of obstacle) to elements (e.g., each entry) of 3D representation 205 generates geometric traversability map 206. In specific embodiments, 3D representation 205 may already include (e.g., be created including) geometric confidence values. In this case, 3D representation 205 is the same as geometric traversability map 206.

Filtered 3D representation 204 may be produced using semantic traversability map 208 and geometric traversability map 206. Filtered 3D representation 104 may be a 2.5D height map, a 3D point cloud, a 3D depth map, or another manner of organizing of 3D data. Filtered 3D representation 204 may be a traversability map describing whether or not a machine (e.g., autonomous vehicle) may move forward, where the vehicle can move, or other features relating to the traversability of the environment. Semantic traversability map 208 and geometric traversability map 206 may be point matched together to create filtered 3D representation 204. In specific embodiments, semantic traversability map 208 is already 3D and thus the point matching may be simple as both semantic traversability map 208 and geometric traversability map 206 represent the same 3D space created from the set of images (first image 201 and second image 202). In specific embodiments, semantic traversability map 208 may be 2D and point matching may be simple because both semantic traversability map 208 and geometric traversability map 206 are based on first image 201. If some elements of first image 201 were eliminated, then corresponding elements of second image 202 may also be eliminated, resulting in these elements being eliminated in filtered 3D representation 204 as well. In some embodiments, no elements of first image 201 may be eliminated, effectively resulting in an unfiltered version of filtered 3D representation 204. In other words, filtered 3D representation 204 may not be filtered.

Both semantic traversability map 208 and geometric traversability map 206 may be fused into a filtered 3D representation (an overall traversability map) by combining both confidence scores (probabilities) for each cell. For example, the geometric confidence score for a given element of geometric traversability map 206 may be combined with the semantic confidence score for the corresponding element of semantic traversability map 208. Filtered 3D representation 204 may be referred to as a merged map, a fused map, and a merged traversability map, among other names. The fusion of the semantic confidence scores and the geometric confidence scores into filtered 3D representation 204 may be referred to as a merged probability of obstacle. The combination of confidence scores may simply be the average of the confidence scores (probabilities of obstacles) or may be a more complex formula that increases the merged probability of obstacle for an element when one of the confidence scores is close to 100%.

Filtered 3D representation 204 may be used to generate warnings, machine commands, or another reaction to the environment. For example, filtered 3D representation 204 may be used to identify an obstacle and generate a stop command, stopping the autonomous vehicle before hitting an obstacle (e.g., a critical obstacle, a hazard). Stopping the autonomous vehicle for a false alarm of an obstacle or a negligible obstacle wastes time, power, money, and productivity. In specific embodiments, the autonomous vehicle may be heavy and extra costly to stop and restart. By using filtered 3D representation 204 to identify obstacles, unnecessary stops due to false alarms may be reduced. Furthermore, the classification (e.g., semantic classification) of the nature of the obstacle allows for a customization of a response, such as limiting the speed of the vehicle for moderately critical obstacles, or emergency braking sooner for critical obstacles such as persons.

Combining semantic traversability map 208 and geometric traversability map 206 to make filtered 3D representation 204 allows identification of dangerous elements or objects that may be missed by simply looking at the geometric property alone. For example, a high voltage line, a fire, or nature of terrain (like loose ground or holes) may be geometrically identified as traversable but semantically identified as non-traversable or dangerous. The combination of semantic and geometric data may also serve as emphasis on critical obstacles such as person, animal, or costly equipment. The redundancy allows for a more robust obstacle identification system.

Figure 3:
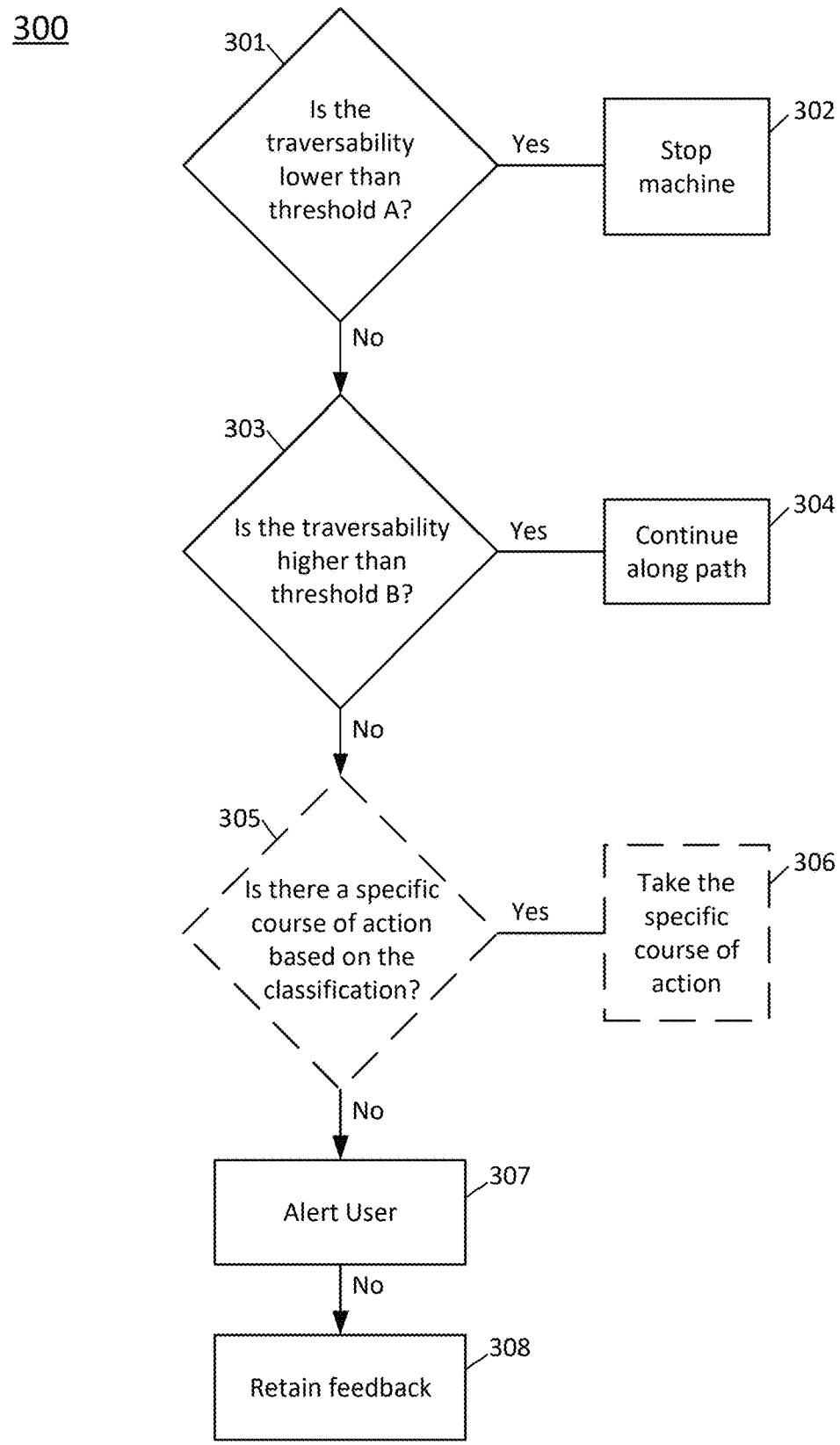
FIG. 3 provides a flowchart describing how a system may respond to a merged probability of obstacle from a filtered 3D representation in accordance with specific embodiments of the inventions disclosed herein.

FIG. 3 illustrates flowchart 300 describing how a system may respond to a merged probability of obstacle from a filtered 3D representation in accordance with specific embodiments of the inventions disclosed herein. The merged probability of obstacle may refer to the combination of geometric confidence score and semantic confidence score for a given object (e.g., geometric or semantic grouping of elements). The merged probability of obstacle may be referred to as a combined traversability score. The filtered 3D representation may be referred to as a traversability map. The filtered 3D representation may correspond to filtered 3D representation 104 or filtered 3D representation 204. Based on the machine movement (e.g., path of motion) and the filtered 3D representation (the traversability map), a decision is taken as to the machine trajectory. Portions (e.g., steps 301 through 308 or portions of steps 301 through 308) of flowchart 300 may be rearranged, omitted, or duplicated in specific embodiments. Flowchart 300 may be repeated for each object in the path of the machine.

At step 301, the traversability score of an object in the path of the machine may be compared to a first threshold (e.g., threshold A).

If the traversability score satisfies (e.g., is lower than or equal to) the first threshold, then, at step 302, the machine may stop. For example, if the system detects an object in the path of the machine with a traversability score of 6, and the first threshold is 30, then the machine may stop. Rather than stopping the machine, or in conjunction with stopping the machine, the system may compute an alternate route to avoid the object. For example, the machine may stop then move around the object, the machine may move around the object without stopping, or the machine may stop and wait for user input. In specific embodiments, the machine may be unable to compute an alternate route to avoid the object due to the nature (e.g., size, position, semantic classification, motion) of the object or other objects. The system may alert the user about any change in speed, direct, path, etc. of the machine. In specific embodiments, the system may send a prompt for a response regarding the obstacle.

At step 303, the traversability score of the object in the path of the machine may be compared to a second threshold (e.g., threshold B). In specific embodiments, the first threshold and the second threshold may be the same threshold, in other specific embodiments, the first threshold and the second threshold may be different thresholds. The second threshold may be higher than the first threshold. Step 303 may occur after, during, or before step 301.

If the traversability score satisfies (e.g., is higher than or equal to) the second threshold (and higher than the first threshold), then, at step 304, the machine may continue along its computed path. For example, if the system detects an object in the path of the machine with a traversability score of 82, and the second threshold is 70, then the machine may continue.

At step 305, the system may check whether a specific course of action is taken based on the classification of the object. In specific embodiments, a specific course of action may be based on a traversability score. Step 305 may occur before, after, or during step 301 or step 303. That is, a specific course of action (e.g., programmed into the system) may be taken on objects without considering the traversability score of the object or while considering the traversability score of the object. In specific embodiments, specific traversability scores, ranges of traversability scores, or classifications may be considered as critical obstacles, moderate obstacles (moderately critical obstacles), non-obstacles, or another category. Some categories of classifications may initiate specific actions.

At step 306, the system may take the action identified at step 305. The action may be customizable. The action may be programmed or learned. For a moderate obstacle (such as a rocky patch of road), the system may continue along the path, but at a reduced speed. For a critical obstacle (such as a person), the system may initiate emergency braking. The system may perform the same action for different obstacles but do so at different times. For example, the machine may brake if a person is identified 20 meters away from the machine, but not brake if a log is identified 20 meters away. Instead, the machine may brake when the log is only 5 meters away. In specific embodiments, the system may be programmed to cause the machine to turn around or go to a specific location if certain objects are detected.

At step 307, if the merged probability of obstacle is between the first and second thresholds (e.g., higher than threshold A and lower than threshold B), a warning can be emitted to the user so that their feedback is collected. In specific embodiments, the system may alert the user even if there is a specific course of action based on the classification or traversability score of the object (e.g., the system may complete both step 306 and step 307). In specific embodiments, the system may alert the user if the machine stops, recalculates its path, or both. In specific embodiments, a prompt for a response regarding the obstacle may be sent.

Between steps 307 and 308 the user may input feedback into the system. For example, the user may tell the machine to move forward if an object is incorrectly identified as an obstacle with an underestimated traversability score. The user may confirm that an object is correctly identified as an obstacle with a reasonable (or overestimated) traversability score. The feedback may be a user decision to discard the alert or confirm it. In specific embodiments, the user may also confirm or correct a classification of an object.

At step 308, the feedback can be retained to improve the system. For example, if a subsequent object may be identified as belonging to the same classification as the object associated with the feedback. The system may adjust the traversability score of the subsequent object based on the feedback. In other words, the classification of the subsequent object will get a higher or lower traversability score based on the user decision. In specific embodiments, the feedback may assist in training a neural network associated with the semantic classification. The system is able to learn and to make customizable decisions. Incorporating user feedback into the filtered 3D representation of the environment may improve the efficiency of the system and machine.

FIG. 4 illustrates an example of chart 400 that includes a range of probability of obstacle 402 and a range of traversability 403 for a given classification 401 in accordance with specific embodiments of the inventions disclosed herein. The specific classifications illustrated are only examples of the classifications that could be made and may include sub-classifications. For example, classifications 401 may be expanded to include logs, branches, fences, boulders, etc., and/or reorganized to exclude trees, etc.

Probability of obstacle 402 may indicate a scaled value that takes into account the semantic certainty of classifying the object correctly, the traversability of the object as classified, the geometric certainty that the object is located correctly, the traversability of the object as geometrically described, and the risks involved in underestimating the critical nature of the object. Probability of obstacle 402 may refer to the probability that a given object (or collection of elements) is an obstacle.

Traversability 403 may refer to the inverse of probability of obstacle 402. For example, a given traversability may be 100 minus the corresponding probability of obstacle. Traversability may describe how certain the system is that an object is located in the path of the machine (or another location) and how dangerous traversing that object would be. For example, there may be a different threshold for being certain that an object is a person and stopping the machine than being certain that the object is a log and stopping the machine because the risks and damages associated with hitting either are different. For example, if there is a 20% chance that a person is in the path of the machine, the system may stop the machine. However, the system may not stop the machine at a 20% chance of a log being in the path of the machine and may instead only stop the machine if there is at least a 50% chance that the log is in the path. The traversability of classifications may be adjusted accordingly based on the risks and damages associated with the classifications. Knowledge of the traversability of objects in the path may reduce false positives and false negatives of objects or obstacles in the path.

Figure 5:
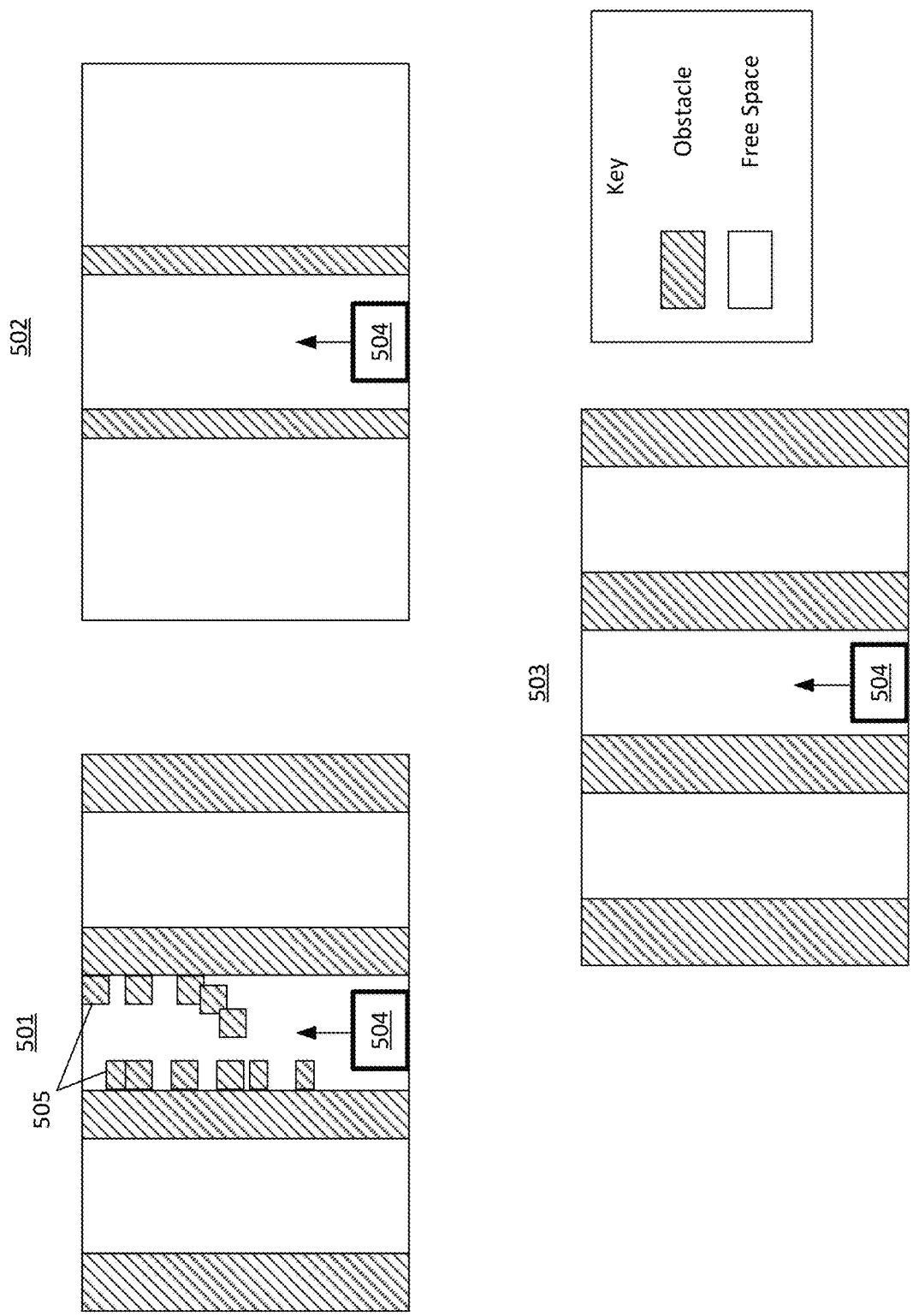
FIG. 5 provides an example of a machine navigating overhanging branches in accordance with specific embodiments of the inventions disclosed herein.

FIG. 5 illustrates an example of a machine navigating overhanging branches 505 in accordance with specific embodiments of the inventions disclosed herein. Geometric map 501, semantic map 502, and combined map 503 show a top view of the same environment that machine 504 is traversing. Machine 504 is shown moving in the indicated direction. The environment may be a field with rows of plants with untrimmed branches and machine 504 may be a tractor. Overhanging branches 505 may represent any traversable portion of an object that may, in part, be non-traversable.

Geometric map 501 may label overhanging branches 505 as obstacles. In specific embodiments, overhanging branches 505 may appear to protrude from the ground floor from the point of view of geometric map 501. Although geometric map 501 may identify overhanging branches 505 as obstacles, overhanging branches 505 may be traversable. This incorrect identification may lead to unnecessary stopping or rerouting of machine 504.

Semantic map 502 may show that all of a plant, including overhanging branches, is a single object. Each plant in a row of plants may share similar aspects such that the row of plants may be considered by the semantic map 502 to be a single object. Accordingly, a plant, a row of plants, or a field of plants may be classified as an obstacle or as free space (e.g., traversable terrain). As shown in semantic map 502, the majority of the field of view is identified as free space. Two rows of obstacles are detected in semantic map 502. These obstacles may have a different classification than the classification associated with overhanging branches 505. For example, the rows of obstacles may refer to trusses, fences, plant cages, tree trunks, woody vines, etc. also present in the field. In some examples, the rows of obstacles may refer to a portion of the plants. In specific embodiments, semantic map 502 may show free space without rows of obstacles.

Combined map 503 may combine traversability scores associated with geometric map 501 and traversability scores associated with semantic map 502 to improve obstacle detection capabilities. The traversability scores may combine to indicate that the rows of plants are obstacles while overhanging branches 505 are not. By fusing the geometric data and semantic information, and by applying the context of the environment, the system may provide relevant information about the obstacles.

Figure 6:
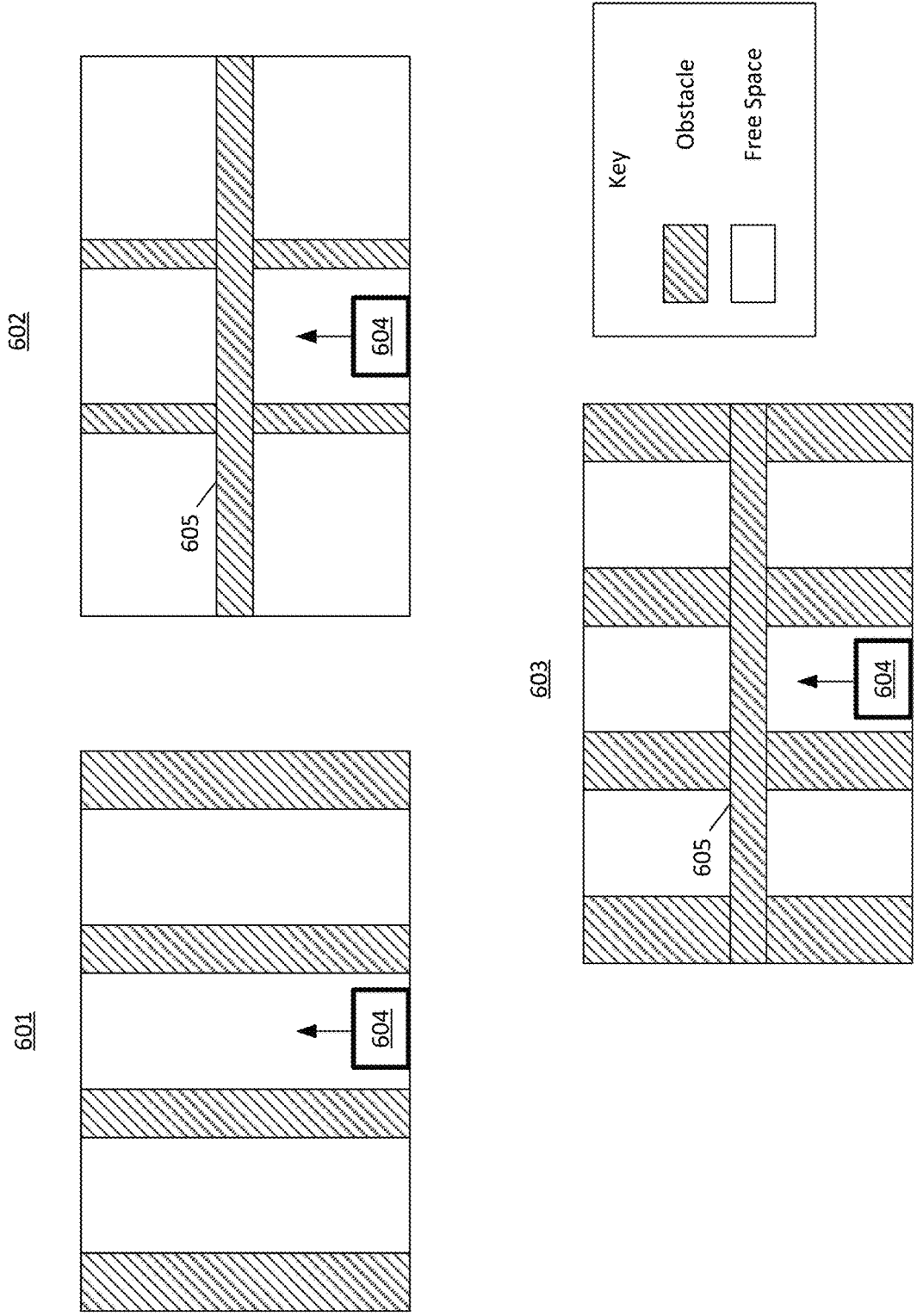
FIG. 6 provides an example of a machine navigating a pipe in accordance with specific embodiments of the inventions disclosed herein.

FIG. 6 illustrates an example of a machine navigating pipe 605 in accordance with specific embodiments of the inventions disclosed herein. Geometric map 601, semantic map 602, and combined map 603 show top views of the same environment that machine 604 is traversing. Machine 604 is shown moving in the indicated direction. The environment may be a field with rows of plants and machine 604 may be a tractor. Pipe 605 may be a water pipe, an electric cord, or any other object that may be geometrically traversable (e.g., physically possible for machine 604 to traverse) but which may cause an issue (e.g., damage to machine 504, damage to that object) if machine 504 were to move over the object.

Geometric map refrain from labeling pipe 605 as an obstacle. In specific embodiments, pipe 605 may be lower than the surrounding plants (or other obstacles). Accordingly, pipe 605 may appear to be a slight bump in the path from the point of view of geometric map 601. Although geometric map 601 may identify pipe 605 as free space (e.g., traversable space), pipe 605 may pose a danger. This incorrect identification may lead to damages, lost productivity, and other negative consequences.

Semantic map 602 may identify pipe 605 as an obstacle. Semantic map 602 may identify pipe 605 based on the appearance of pipe 605 beyond its geometric properties. Semantic map 602 may be able to classify pipe 605 (e.g., detect this specific type of object) via a semantic neural network. Additionally, a 3D representation (e.g., point cloud, depth map) may be used to calculate the location of pipe 605 (e.g., calculate the distance to pipe 605 from machine 604).

Combined map 603 may combine traversability scores associated with geometric map 601 and traversability scores associated with semantic map 602 to improve obstacle detection capabilities. The traversability scores may combine to indicate that pipe 605 as well as the rows of plants are obstacles. By fusing the geometric data and semantic information, and by applying the context of the environment, the system may provide relevant information about the obstacles.

Figure 7:
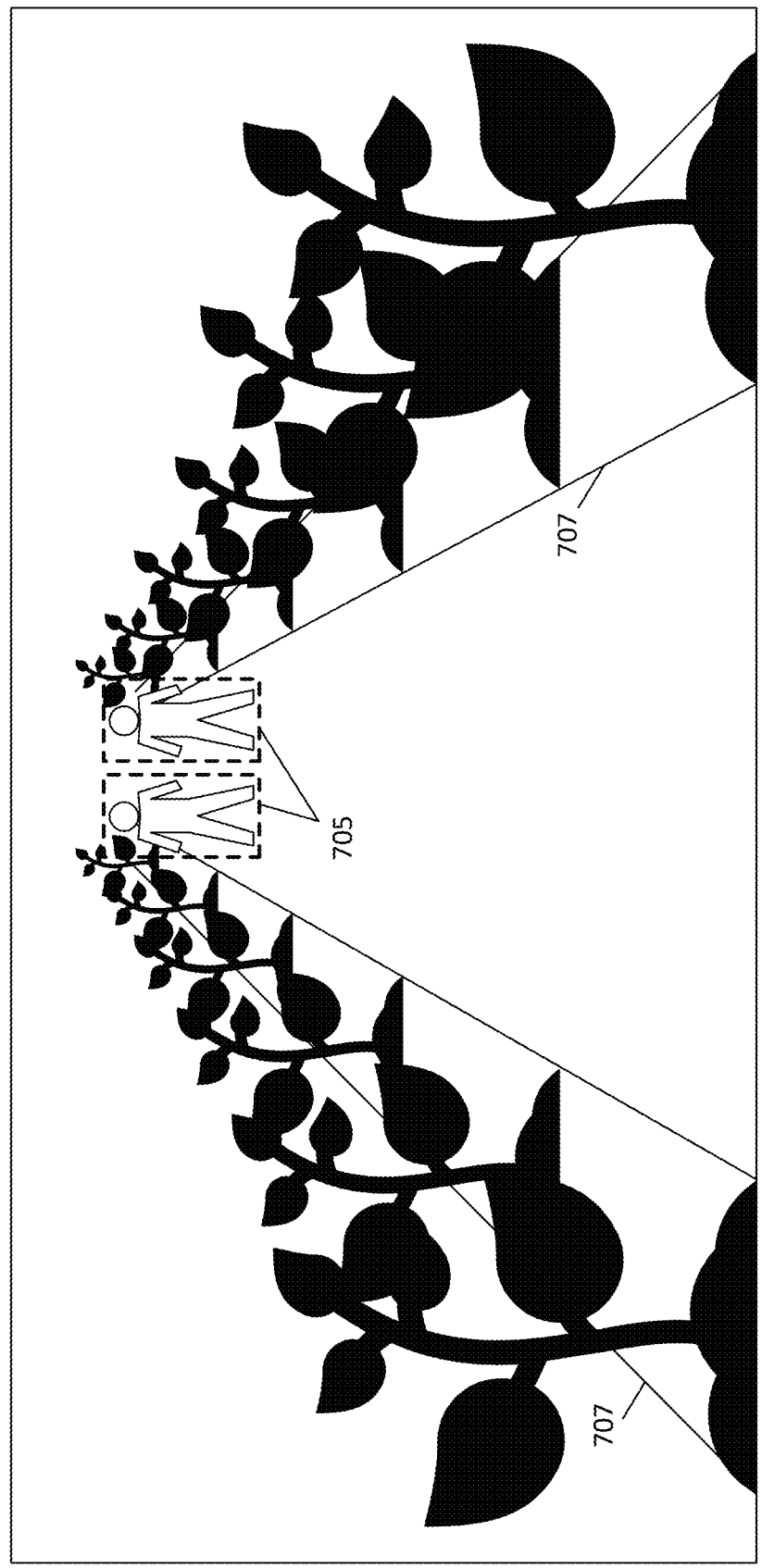
FIG. 7 provides an example of a portion of a field of view of a machine navigating an environment with critical obstacles in accordance with specific embodiments of the inventions disclosed herein.

FIG. 7 illustrates an example of a portion of a field of view of a machine navigating an environment with critical obstacles 705 and two rows of obstacles 707 in accordance with specific embodiments of the inventions disclosed herein. Critical obstacles 705 may be in the path of the machine. In specific embodiments, critical obstacles 705 may be people, rows of obstacles 707 may be plants, and the environment may be a farm, vineyard, orchard, or the like.

Both geometric obstacle detection and semantic obstacle detection may identify critical obstacles 705. Semantic obstacle detection may identify critical obstacles 705 before geometric obstacle detection identifies them. By using both semantic obstacle detection and geometric obstacle detection, the overall confidence of obstacle detection increases. Additionally, the fusion of semantic obstacle detection and geometric obstacle detection may provide a warning and stop the machine at an early stage. Some critical obstacles, such as people, animals, or vehicles, may move (e.g., closer to the machine). This may reduce the time that the system has to identify and stop the machine before a collision, making early warning systems essential. Accordingly, the redundancy of fusing two obstacle detection systems provides extra safety.

Figure 8:
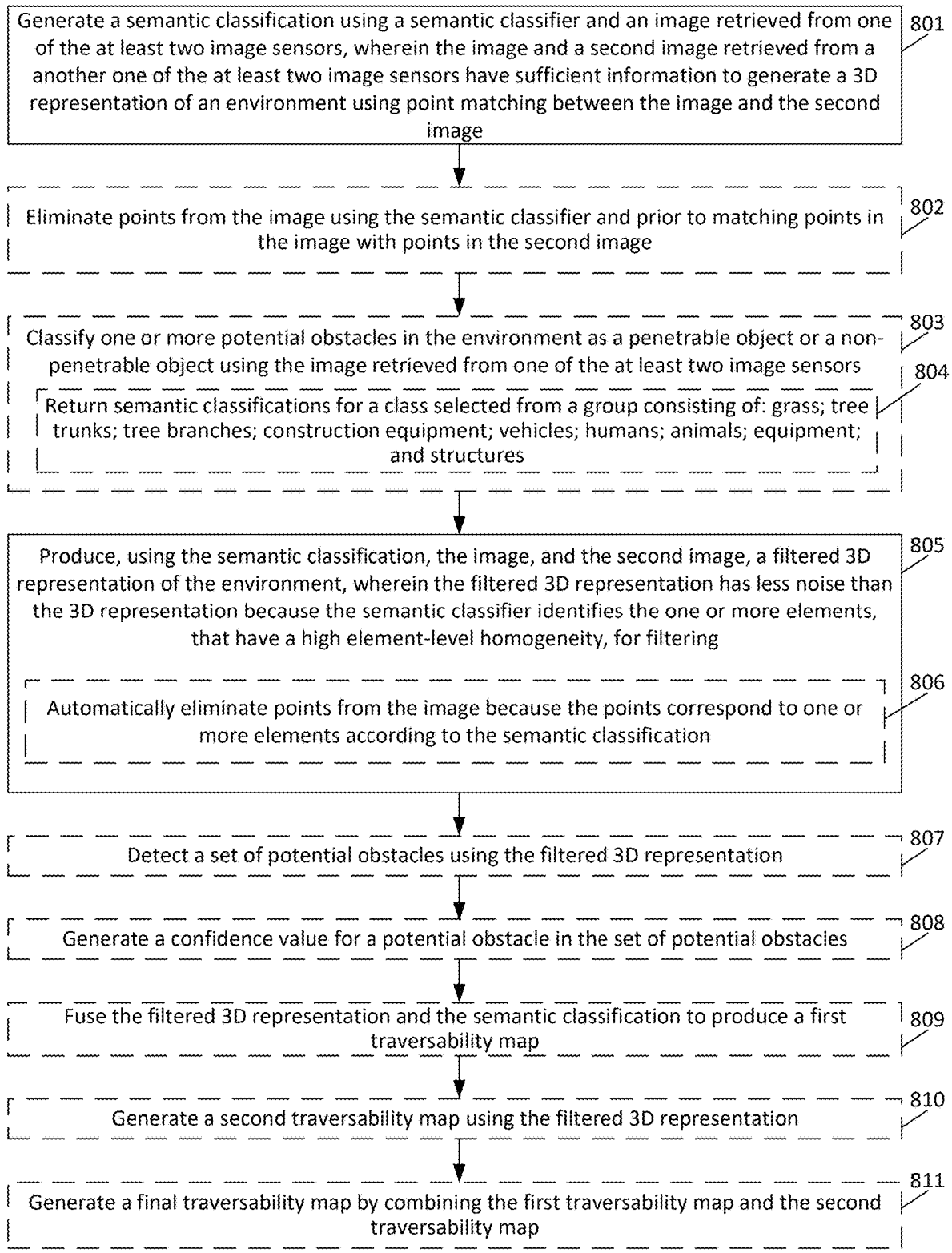
FIG. 8 provides an example of a method for detecting soft obstacles including generating a semantic classification and producing a filtered 3D representation in accordance with specific embodiments of the inventions disclosed herein.

FIG. 8 illustrates an example of method 800 of detecting soft obstacles including generating a semantic classification and producing a filtered 3D representation in accordance with specific embodiments of the inventions disclosed herein. Method 800 may be implemented by a system comprising at least two image sensors forming a stereo camera, one or more processors, and one or more non-transitory computer-readable media. Steps (or portions of steps) of method 800 may be rearranged, omitted, or duplicated.

At step 801, a semantic classification may be generated. The semantic classification may be generated using a semantic classifier and an image retrieved from one of the at least two image sensors. A second image may be retrieved from the other of the at least two image sensors. Together, the image and the second image may have sufficient information to generate a 3D representation of an environment (e.g., the environment depicted by the stereo camera) using point matching between the image and the second image. Although there is sufficient information to generate the 3D representation of the environment, in specific embodiments this 3D representation is not made directly from the image and the second image. In specific embodiments, the image is filtered before a 3D representation is made. In specific embodiments, a 3D representation is made directly from the image and the second image. The semantic classification may include classes for traversable objects and non-traversable objects.

In specific embodiments, at step 802, points from the image are eliminated. The points may be eliminated using the semantic classifier. Points may be eliminated prior to matching points in the image with points in the second image (e.g., prior to point matching). Eliminating the points may cause a filtered 3D representation of the environment to have less noise than an unfiltered 3D representation (e.g., a representation made directly from the image and the second image without eliminating any points).

In specific embodiments, at step 803, one or more potential obstacles in the environment may be classified as a penetrable (e.g., traversable) object or a non-penetrable (e.g., non-traversable) object. The one or more potential obstacles may be classified using the image retrieved from the one of the at least two image sensors.

In specific embodiments, at step 804 and as part of classifying the one or more potential obstacles in the environment, semantic classifications for a class may be returned (e.g., output, assigned). The class may be selected from a group consisting of grass, tree trunks, tree branches, construction equipment, vehicles, humans, animals, equipment, and structures. In specific embodiments, the class may be selected from a group comprising additional classes, fewer classes, or a different combination of classes. The classifying may be done using a neural network. The neural network may run in parallel with generating a 3D representation of the environment. Classifying the one or more potential obstacles may include returning semantic classifications for dangerous objects.

At step 805, a filtered 3D representation of the environment may be produced. The filtered 3D representation of the environment may be produced using the semantic classification, the image, and the second image. The filtered 3D representation may have less noise than a (generated or hypothetical) 3D representation made directly from point matching the image and the second image (e.g., unfiltered, without eliminating points at step 802 or step 805). The filtered 3D representation may have less noise than the 3D representation made directly from the image and the second image because the semantic classifier identifies one or more elements for filtering. The identified one or more elements may have a high element-level homogeneity (e.g., elements relating to the sky). The one or more elements for filtering may be in one or more classes of the semantic classifier. The one or more classes of the semantic classifier may be for elements that are difficult to match between images captured by the at least two image sensors of the stereo camera. The one or more classes of the semantic classifier may be for elements that are easy to match between images captured by the at least two image sensors of the stereo camera. The filtered 3D representation may be a depth map or a 3D point cloud.

In specific embodiments, at step 806 and as part of producing the filtered 3D representation, points from the image may be automatically eliminated. The points may be automatically eliminated from the image because the points correspond to one or more elements according to the semantic classification. For example, points that are semantically classified as "sky" may be automatically eliminated.

In specific embodiments, at step 807, a set of potential obstacles may be detected. The set of obstacles may be detected using the filtered 3D representation (e.g., produced at step 805). The set of potential obstacles may include traversable obstacles, non-traversable obstacles, or a combination thereof. The set of potential obstacles may include any quantity of obstacles.

In specific embodiments, at step 808, a confidence value for a potential obstacle in the set of potential obstacles (e.g., from step 807) may be generated. The confidence value may correspond to a semantic traversability score, a geometric traversability score, a combination of the two, or a different value.

In specific embodiments, at step 809, the filtered 3D representation and the semantic classification may be fused to produce a first traversability map.

In specific embodiments, at step 810, a second traversability map may be generated using the filtered 3D representation. The second traversability map may include geometric information. The filtered 3D representation may be a height map.

In specific embodiments, at step 811, a final traversability map may be generated by combining the first traversability map (e.g., from step 809) and the second traversability map (e.g., from step 810). The final traversability map may be used to reduce false positives and false negatives in obstacle detection.

Figure 9:
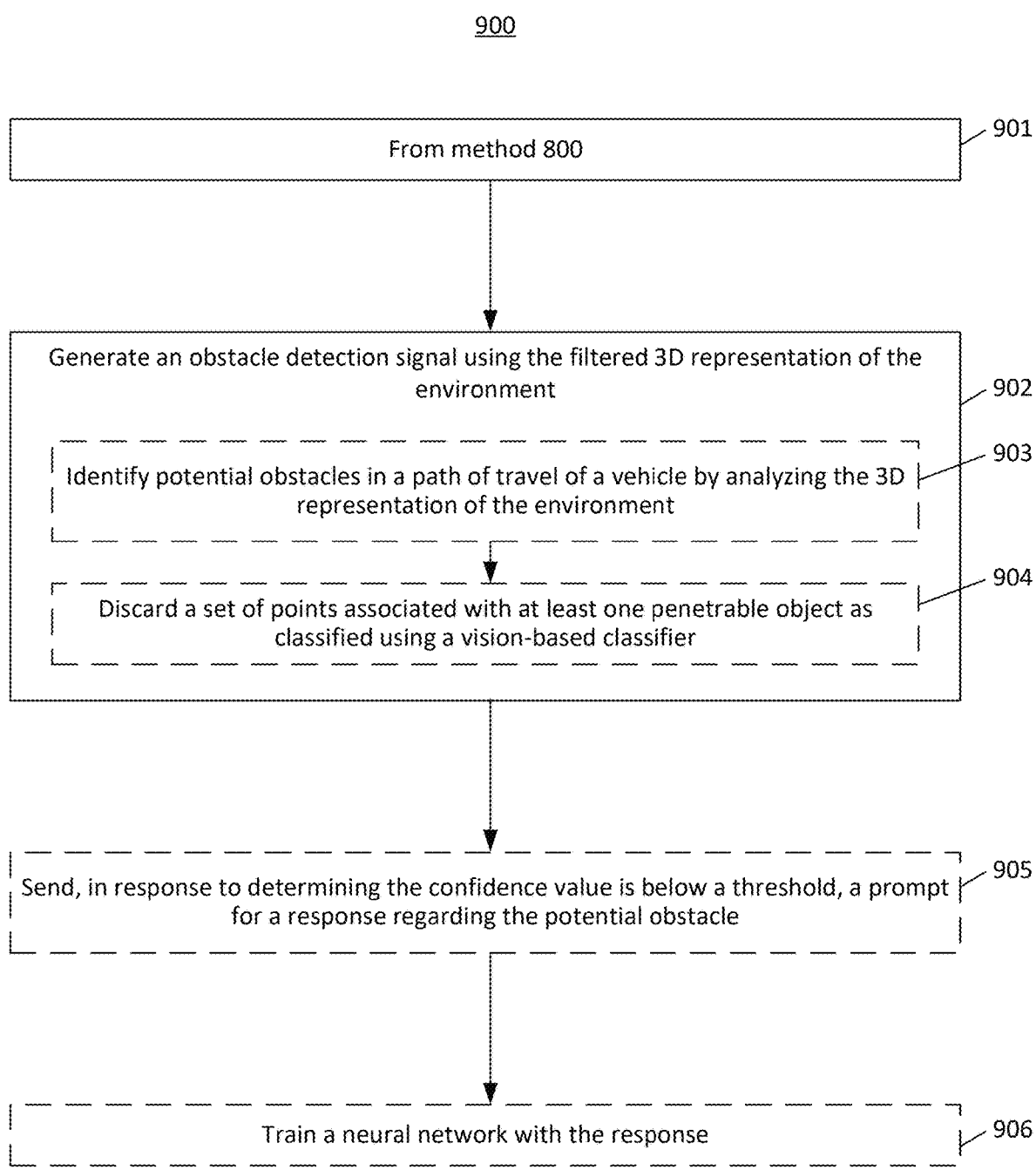
FIG. 9 provides an example of a method for detecting soft obstacles including generating an obstacle detection signal in accordance with specific embodiments of the inventions disclosed herein.

FIG. 9 represents an example of method 900 of detecting soft obstacles including generating an obstacle detection signal in accordance with specific embodiments of the inventions disclosed herein. Method 900 may be implemented by a system comprising at least two image sensors forming a stereo camera, one or more processors, and one or more non-transitory computer-readable media. Steps (or portions of steps) of method 900 may be rearranged, omitted, or duplicated. Method 800 may be incorporated into method 900. For example, step 902 through step 906 may be a continuation of method 800 from FIG. 8.

In specific embodiments, at step 901, aspects of method 800 of FIG. 8 may be performed. Some steps or portions of steps of method 800 may be omitted, rearranged, duplicated, or interleaved within method 900.

At step 902, an obstacle detection signal may be generated. The obstacle detection signal may be generated using a filtered 3D representation of the environment (e.g., from step 805).

In specific embodiments, at step 903 and as part of generating the obstacle detection signal, potential obstacles may be identified. The potential obstacles may be located in a path of travel of a vehicle (e.g., a machine, autonomous vehicle, semi-autonomous vehicle) by analyzing the 3D representation of the environment. Generating the obstacle detection signal may be based on at least one potential obstacle being classified into a class of dangerous objects. Generating the obstacle detection signal may be based on a first traversability map (e.g., from step 809) and a second traversability map (e.g. from step 810).

In specific embodiments, at step 904 and as part of generating the obstacle detection signal, a set of points associated with at least one penetrable object may be discarded. The set of points associated with the at least one penetrable object may be classified using a vision-based classifier. The set of points may be discarded based on the classification of the penetrable object. The classification may be that the object is penetrable or may be that the object belongs to a class that is penetrable (grass, etc.).

In specific embodiments, at step 905, a prompt may be sent. The prompt may be sent in response to determining the confidence value (e.g., generated at step 808) associated with the potential obstacle satisfies a threshold (e.g., is at or below a threshold). The prompt may be sent to a user and may ask for a response regarding the potential obstacle. The user may disregard the potential obstacle as a traversable object or may affirm the potential obstacle as a non-traversable object.

In specific embodiments, at step 906, a neural network may be trained with the response given by the user (e.g., after the prompt is sent at step 905). The continued training of the neural network may reduce false positives and false negatives in obstacle detection and may improve the efficiency of the machine and users (e.g., operators).

Figure 10:
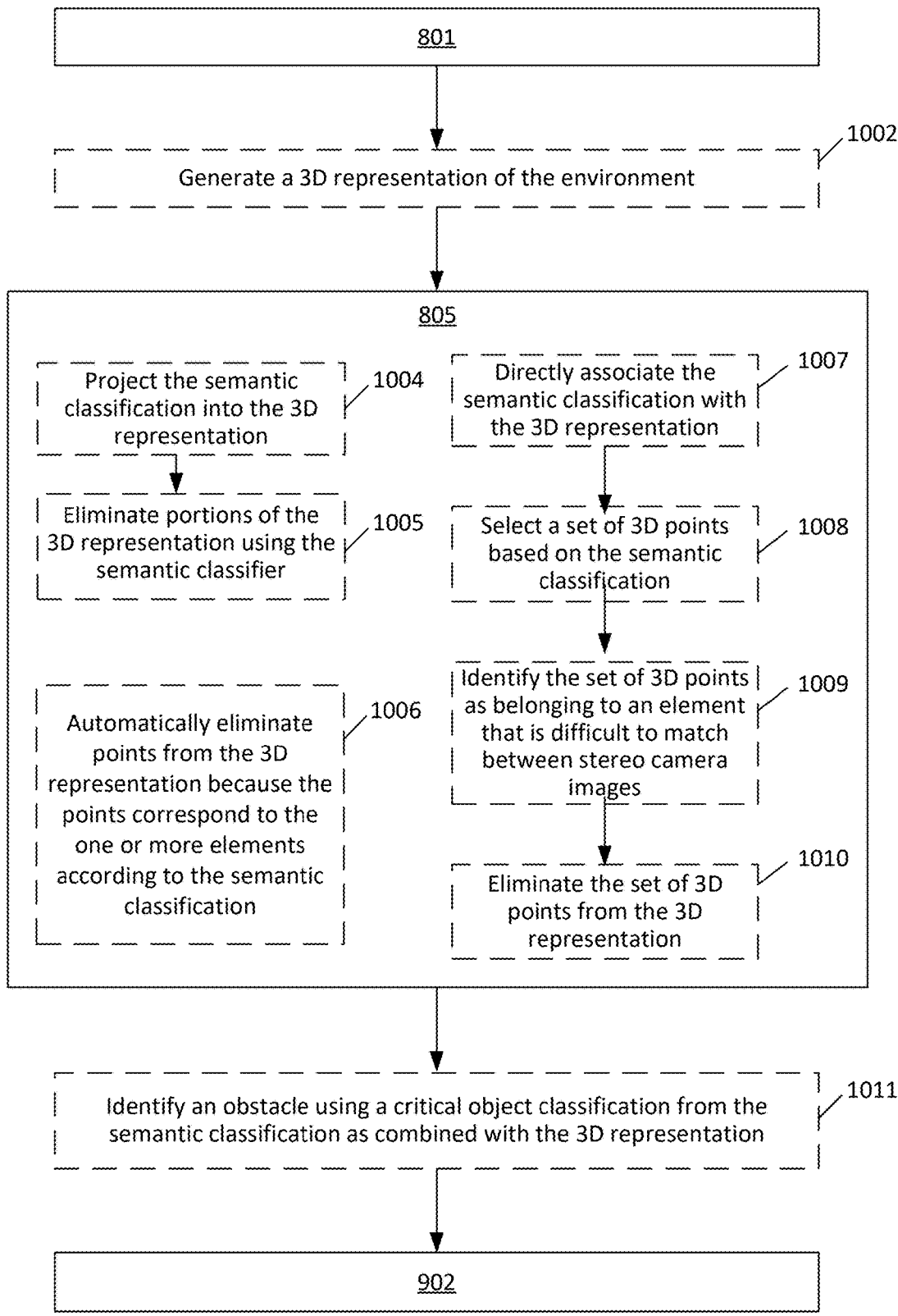
FIG. 10 provides an example of a method for detecting soft obstacles including generating a 3D representation and a filtered 3D representation in accordance with specific embodiments of the inventions disclosed herein.

FIG. 10 illustrates an example of method 1000 of detecting soft obstacles including generating a 3D representation and a filtered 3D representation in accordance with specific embodiments of the inventions disclosed herein. Method 1000 may be implemented by a system comprising at least two image sensors forming a stereo camera, one or more processors, and one or more non-transitory computer-readable media. Steps (or portions of steps) of method 1000 may be rearranged, omitted, or duplicated. Method 1000 (or aspects of method 1000) may be incorporated into method 800 or method 900.

In method 1000, step 801 may be the same as step 801 of method 800. A semantic classification may be generated using a semantic classifier and an image retrieved from an image sensor. A second image may be retrieved from a different image sensor. Together, the image and the second image may have sufficient information to generate a 3D representation of an environment (e.g., the environment depicted by the stereo camera) using point matching between the image and the second image.

In specific embodiments, at step 1002, a 3D representation of the environment is generated. The 3D representation may be made directly from the image and the second image (e.g., without filtering, eliminating points, etc.). The 3D representation may be a depth map or a 3D point cloud.

In method 1000, step 805 may be the same as step 805 of method 800. At step 805, a filtered 3D representation of the environment may be produced. There are many ways in which the filtered 3D representation may be produced. In specific embodiments, filtered 3D representation of the environment may be produced using the semantic classification, the image (e.g., a semantically classified first image), and the second image directly. In specific embodiments, the filtered 3D representation may be derived from the 3D representation (e.g., generated at step 1002). The filtered 3D representation may have less noise than the 3D representation because the semantic classifier may identify one or more elements for filtering. The identified one or more elements may have a high element-level homogeneity (e.g., elements relating to the sky). The one or more elements may correspond to a class that is programmed to be filtered out. The one or more elements may correspond to elements that are difficult to match between the first image and the second image.

In specific embodiments, at step 1004 and as part of producing the filtered 3D representation, a semantic classification may be projected into the 3D representation. The semantic classification may be generated at step 801.

In specific embodiments, at step 1005 and as part of producing the filtered 3D representation, portions of the 3D representation may be eliminated using the semantic classifier. Eliminating portions of the 3D representation using the semantic classifier may be considered "filtering" the 3D representation.

In specific embodiments, at step 1006 and as part of producing the filtered 3D representation, points may be automatically eliminated from the 3D representation. Step 1005 may occur as part of step 1004 or may occur separately. The points may be automatically eliminated from the image because the points correspond to one or more elements according to the semantic classification. For example, points that are semantically classified as "sky" may be automatically eliminated. Automatically eliminating points from the 3D representation may be considered "filtering" the 3D representation.

In specific embodiments, at step 1007 and as part of producing the filtered 3D representation, the semantic classification may be directly associated with the 3D representation. The semantic classifier may identify objects in the 3D representation.

In specific embodiments, at step 1008 and as part of producing the filtered 3D representation, a set of 3D points may be selected. The set of 3D points may be selected based on their semantic classification.

In specific embodiments, at step 1009 and as part of producing the filtered 3D representation, the set of 3D points may be identified as belonging to an element that is difficult to match between stereo camera images. For example, the set of 3D points may correspond to the sky.

In specific embodiments, at step 1010 and as part of producing the filtered 3D representation, the set of 3D points (e.g., selected at step 1008 and identified at step 1009) may be eliminated from the 3D representation. Eliminating the set of 3D points may be considered "filtering" the 3D representation.

In specific embodiments, at step 1011, an obstacle may be identified. The obstacle may be identified using a critical object classification from the semantic classification as combined with the 3D representation (e.g., at step 1004 or at step 1007). The critical object may not be detectible in the 3D representation alone (e.g., without the semantic classification).

In method 1000, step 902 may be the same as step 902 of method 900. At step 902, an obstacle detection signal may be generated. The obstacle detection signal may be generated using a filtered 3D representation of the environment (e.g., from step 805). Using method 1000, false negatives and false positives of obstacle detection may be reduced.

At least one processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a double data rate dynamic random-access memory (DDR DRAM). The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to autonomous vehicles on the ground, the same approaches could be utilized to guide movement of other machines in other environments (such as the air, sea, and space exploration). These and other modifications and variations to the present invention may be practiced by those skilled in the art, without departing from the scope of the present invention, which is more particularly set forth in the appended claims.

What is claimed is:

1. A method for detecting an obstacle, with a stereo camera comprising at least two image sensors, the method comprising:
generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image;
producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering;
generating an obstacle detection signal using the filtered three-dimensional representation of the environment;
fusing the filtered three-dimensional representation and the semantic classification to produce a first traversability map with a first set of confidence values wherein the confidence values are traversability scores;
generating a second traversability map using the filtered three-dimensional representation with a second set of confidence values; and
generating a final traversability map by combining the first traversability map and the second traversability map using the first set of confidence values and the second set of confidence values.

2. The method of claim 1, wherein the one or more elements include the sky.

3. The method of claim 1, wherein producing the filtered three-dimensional representation comprises:
automatically eliminating points from the image or points from the three-dimensional representation because the points correspond to the one or more elements according to the semantic classification.

4. The method of claim 1, wherein producing the filtered three-dimensional representation comprises:
eliminating points from the image using the semantic classifier and prior to matching points in the image with points in the second image.

5. The method of claim 1, wherein producing the filtered three-dimensional representation comprises:
generating the three-dimensional representation using the image and the second image;
projecting the semantic classification into the three-dimensional representation; and
eliminating portions of the three-dimensional representation using the semantic classifier.

6. The method of claim 1, wherein:
the one or more elements are in one or more classes of the semantic classifier; and
the one or more classes of the semantic classifier are for elements that are difficult to match between images captured by the at least two image sensors of the stereo camera.

7. The method of claim 1, wherein:
the one or more elements are not in one or more classes of the semantic classifier; and
the one or more classes of the semantic classifier are for elements that are easy to match between images captured by the at least two image sensors of the stereo camera.

8. The method of claim 1, wherein producing the filtered three-dimensional representation using the semantic classification comprises:
generating the three-dimensional representation using the image and the second image;
directly associating the semantic classification with the three-dimensional representation;
selecting a set of three-dimensional points based on the semantic classification;
identifying the set of three-dimensional points as belonging to an element that is difficult to match between stereo camera images; and
eliminating the set of three-dimensional points from the three-dimensional representation.

9. The method of claim 1, wherein the three-dimensional representation is one of a depth map and a three-dimensional point cloud.

10. The method of claim 1, wherein generating the obstacle detection signal using the filtered three-dimensional representation of the environment comprises:
identifying potential obstacles in a path of travel of a vehicle by analyzing the three-dimensional representation of the environment.

11. The method of claim 1, further comprising:
classifying one or more potential obstacles in the environment as a penetrable object or a non-penetrable object using the image retrieved from one of the at least two image sensors;
wherein generating the obstacle detection signal using the filtered three-dimensional representation includes discarding a set of points associated with at least one penetrable object as classified using a vision-based classifier.

12. The method of claim 11, wherein the classifying of the one or more potential obstacles includes:
returning semantic classifications for a class selected from a group consisting of: grass; tree trunks; tree branches; construction equipment; vehicles; humans; animals; equipment; and structures.

13. The method of claim 12, wherein:
the classifying is done using a neural network; and
the neural network runs in parallel with generating the three-dimensional representation of the environment.

14. The method of claim 11, wherein:
the classifying of the one or more potential obstacles includes returning semantic classifications for a class of dangerous objects; and
the generating of the obstacle detection signal is conducted based on at least one of the one or more potential obstacles being classified into the class of dangerous objects.

15. The method of claim 1, further comprising:
detecting a set of potential obstacles using the filtered three-dimensional representation;
generating a confidence value for a potential obstacle in the set of potential obstacles; and
sending, in response to determining the confidence value is below a threshold, a prompt for a response regarding the potential obstacle.

16. The method of claim 15, further comprising:
training a neural network with the response regarding the potential obstacle.

17. The method of claim 1,
wherein: (i) the filtered three-dimensional representation is a height map; (ii) the semantic classification includes classes for traversable objects and non-traversable objects; and (iii) the obstacle detection signal is generated based on the first traversability map and the second traversability map.

18. The method of claim 1, further comprising:
generating the three-dimensional representation using information using the image and the second image; and
identifying the obstacle using a critical object classification from the semantic classification as combined with the three-dimensional representation;
wherein a critical object from the critical object classification is not detectible in the three-dimensional representation alone.

19. A method for detecting an obstacle, with a stereo camera comprising at least two image sensors, the method comprising:
generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image;
producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering;
generating an obstacle detection signal using the filtered three-dimensional representation of the environment;
fusing the filtered three-dimensional representation and the semantic classification to produce a first traversability map; and
generating a second traversability map using the filtered three-dimensional representation;
wherein: (i) the filtered three-dimensional representation is a height map; (ii) the semantic classification includes classes for traversable objects and non-traversable objects; and (iii) the obstacle detection signal is generated based on the first traversability map and the second traversability map.

20. A method for detecting an obstacle, with a stereo camera comprising at least two image sensors, the method comprising:
generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image;
producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering;
generating an obstacle detection signal using the filtered three-dimensional representation of the environment;
detecting a set of potential obstacles using the filtered three-dimensional representation;
generating a confidence value for a potential obstacle in the set of potential obstacles;
sending, in response to determining the confidence value is below a threshold, a prompt for a response regarding the potential obstacle; and
training a neural network with the response regarding the potential obstacle.

21. A method for detecting an obstacle, with a stereo camera comprising at least two image sensors, the method comprising:
generating a semantic classification using a semantic classifier and an image retrieved from one of the at least two image sensors, wherein the image and a second image retrieved from another one of the at least two image sensors have sufficient information to generate a three-dimensional representation of an environment using point matching between the image and the second image;
producing, using the semantic classification, the image, and the second image, a filtered three-dimensional representation of the environment, wherein the filtered three-dimensional representation has less noise than the three-dimensional representation because the semantic classifier identifies one or more elements, that have a high element-level homogeneity, for filtering;
generating an obstacle detection signal using the filtered three-dimensional representation of the environment; and
classifying one or more potential obstacles in the environment as a penetrable object or a non-penetrable object using the image retrieved from one of the at least two image sensors;
wherein: (i) generating the obstacle detection signal using the filtered three- dimensional representation includes discarding a set of points associated with at least one penetrable object as classified using a vision-based classifier; (ii) the classifying of the one or more potential obstacles includes: returning semantic classifications for a class selected from a group consisting of: grass; tree trunks; tree branches; construction equipment; vehicles; humans; animals; equipment; and structures; (iii) the classifying is done using a neural network; and (iv) the neural network runs in parallel with generating the three-dimensional representation of the environment.

* * * * *